Figure 1:
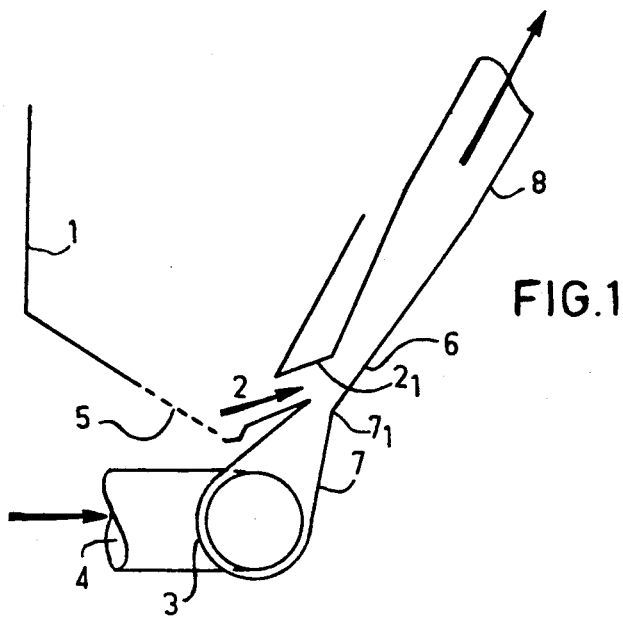

United States Patent [19]

Grataloup

[11] 4,060,181
[45] Nov. 29, 1977

[54] METHOD AND APPARATUS FOR CONTROLLING THE TRANSFER OF PARTICULATE MATERIAL

[75] Inventor: Xavier Roger Grataloup, Montereau, Siene et Marne, France

[73] Assignee: Nodet-Gougis (Societe de droit francais), France

[21] Appl. No.: 700,500

[22] Filed: June 28, 1976

[30] Foreign Application Priority Data

July 3, 1975  France .................................. 75.20987
Feb. 9, 1976  France .................................. 76.03519

[51] Int. Cl.² ............................................. B65D 83/06
[52] U.S. Cl. .................................... 222/193; 302/52
[58] Field of Search ................. 222/193, 195; 302/52

[56] References Cited

U.S. PATENT DOCUMENTS

| 1,970,405 | 8/1934 | Thomas | 302/52 X |
| 3,345,111 | 10/1967 | Bies | 302/52 X |
| 3,933,394 | 1/1976 | Klein et al. | 302/52 X |
| 3,964,793 | 6/1976 | Volpeliere | 302/52 X |

*Primary Examiner*—Stanley H. Tollberg

*Attorney, Agent, or Firm*—Diller, Brown, Ramik & Wight

[57] ABSTRACT

Method and apparatus are disclosed herein in which particulate material, e.g., seeds, is transferred from a main hopper to an auxiliary storage bin (which may be combined with a dispensing unit) through a hermetic conduit having a rising portion. An air stream produced by a source of compressed air entrains the particulate materiel. A partial vacuum is created in the conduit and dissipates as the auxiliary storage bin fills, reaching or surpassing zero when the auxiliary storage bin is full. The particulate material is introduced into the conduit at the same location as the partial vacuum therein. In a preferred embodiment the particulate material may be drawn out of the main hopper through an outlet chute connected proximate to the construction of a venturi which is connected between the source of compressed air and the conduit. Alternatively two venturis may be provided, one for drawing off particulate material from the main hopper and the other for conveying the entrained particulate material to the auxiliary storage bin. The two venturis may be disposed side by side and connected through a single passage to a source of compressd air at one of their ends and opening into the top side of the rising portion at their other ends.

15 Claims, 7 Drawing Figures

METHOD AND APPARATUS FOR CONTROLLING THE TRANSFER OF PARTICULATE MATERIAL

The present invention relates to the field of pneumatic, metering and dispensing apparatus, particularly for farm machinery such as precision pneumatic seeding apparatus with automatic feed control.

The invention is concerned with a method and apparatus for transferring particulate substances, especially seeds, from a main hopper or storage unit to at least one auxiliary storage bin or unit in which the particulate substance or material is put into suspension in a stream of air which is carried from the main hopper to the auxiliary storage bin through a hermetic conduit, the degree to which the auxiliary storage tank is filled determining the quantity of particulate substance conveyed.

French Pat. No. 1,558,490 discloses a precision seeding apparatus comprising a plurality of plowshares each of which is associated with an individual sowing or storage and dispensing unit which is connected through a conduit to a main hopper mounted on a frame or chassis (of the plow) and is provided with a vent communicating with the surroundings. The conduit between the main storage tank and each auxiliary storage bin includes a bend or elbow disposed above their free ends, and dips into the auxiliary and main hopper, sealed off from the ambient atmosphere, the main hopper being connected at its bottom to an air blower. Under these circumstances each auxiliary storage bin is supplied individually and automatically with seeds blown directly out of said main hopper. With such a feed control, by the accumulation of seeds in the auxiliary storage bin of the storage and dispensing unit, there is provided at the end of the seed transfer conduit a pressure drop which sufficiently slows the air flow in the conduit so that seeds are no longer conveyed in a substantially vertical section of the conduit located upstream of the high point therein, thereby cutting off the supply of seeds to the auxiliary storage bin when it is full. This apparatus has been shown to be of considerable practical interest, however, it suffers from the drawback of being relatively expensive owing the requirement of a hermetic main hopper. Moreover, experience has demonstrated that, especially in the case of lightweight seeds, there may occur at the bottom of the central section of the seed transfer conduit in contact with seeds in the main hopper, due to seeds accumulated in the entrance to the conduit, a preferential reduced air flow path when the auxiliary storage bin is full. Along this preferential path of reduced section compared to the transfer conduit, the air stream, although having a low flow rate, may attain a sufficiently high speed to entrain light seeds. These light seeds are not entrained beyond the section of the transfer conduit free of seeds whereupon the air flow rate drops, but these same light seeds may, in accumulating, prolong the preferential air flow path. If the auxiliary storage bin does not empty quickly, this phenomenon may continue thereby causing by the accumulation of seeds at the entrance to the transfer conduit, a pressure drop which sufficiently slows the air flow to prevent the supply of seeds to the auxiliary bin when it becomes empty, there no longer being a pressure drop at this point in the transfer conduit. It has been found that, in addition, for the dispensing of light seeds, the auxiliary storage bin for each individual dispensing unit must be of relatively large capacity so as to obtain good feed control, thereby further increasing production cost and making the device bulkier.

An aim of the present invention is to overcome the just above mentioned drawbacks. According to the invention there is provided an automatic feed control for supplying the auxiliary storage bin from the main hopper, such control operating as a function of the degree to which the at least one auxiliary storage bin is filled.

Another object of the present invention is the provision of means enabling precision dispensing, inter alia, of all types of "heavy" and "light" seeds.

The present invention provides a method of controlling the flow of a particulate substance from a main hopper to at least one auxiliary storage bin, the particulate substance being carried through a hermetic conduit having a rising portion by a gas stream having a flow rate variable as a function of the degree, to which the auxiliary storage bin is full, wherein the improvement comprises providing at a location in the conduit a partial vacuum which dissipates as a function of the filling of the auxiliary storage bin until it reaches at least zero pressure once it is too full and introducing the particulate substance into the gas stream at the said location in said conduit.

So the priming of feed control is obtained, according to the invention, by producing a partial vacuum at a location and by introducing the particulate substance at the said location into the conveying air stream so that the seeds are drawn out of the main hopper as long as the auxiliary storage units are not completely full, the partial vacuum disappearing when they become full.

Namely by way of French Patents published under Nos. 2,003,453 and 2,016,199 fertilizer spreading apparatus are known in which the conduits communicate directly with the ambient atmosphere and not with the auxiliary storage bins in which feed is to be controlled. If these patents effectively disclose the entry of a substance in a rising conduit, the pressure at the entry point is constant and does not diminish as is the case herein, in order to stop the suction of seeds out of the hopper.

Another French Patent published under No. 2,233,806 concerns the formation of swirls and French Patent published under No. 2,214,650 relates to the unclogging and draining of a storage tank. None of these publications suggest the priming of an automatic feed control as set out herein.

In carrying out the method according to the invention seeds from the main hopper may be sucked out by a venturi outside the main storage bin flowing into a rising pathway and conveyed directly to auxiliary storage bins, preferably passing through a high point, air being exhausted from each auxiliary storage bin by a perforate surface of vents distributed over part if its lateral walls, the vent diameters being smaller than that of the seeds. In the present apparatus it is possible to use a nonhermetic hopper preferably equipped with an air in-take proximate to the seed outlet zone. There may also be provided a supplemental air stream acting upstream of the high point in the conduit between the main hopper and the auxiliary storage bin, such a supplemental air stream being supplied by compressed air or by another source of air under pressure.

A pneumatic seed conveying system is thus provided in which the air stream which carries the seeds away from the main storage bin and the air stream which conveys them are independent and the first mentioned air stream rises to zero pressure or becomes a reversed air stream when the pressure drop at the end of the conduit attains a certain value by the accumulation of seeds in the auxiliary storage bin associated with a dispensing unit. In this manner the possibility of continuing delivery of seeds into the conduit, when the auxiliary storage bin is full, is thus eliminated, the supply of seeds to the conduct stopping well before the main stream becomes too small to assure the conveyance of seeds.

The proper functioning of the apparatus is assured, that is the drawing off of seeds from the main storage bin by the auxiliary air stream, by eliminating, because of the rising air stream, the direct charging of the venturi with the seeds from the bottom of the main hopper. Such a charging may cause a gravity flow of seeds since, particularly in the case of heavy seeds, the reversal of the direction of the auxiliary air stream does not suffice (when the auxiliary storage bin is full) to keep the seeds from leaving the main hopper. The air intake in the main hopper moverover limits the layer of seeds through which the auxiliary air stream must pass and therefore the pressure drop due to the seeds accumulated therein.

As for heavy seeds, it normally requires a large supplemental air stream in order to draw them out of the hopper and thereby higher pressures to supply the venturi located downstream along the conduit.

The present invention also resolves this problem by the addition of a second venturi situated upstream of the high point of the transfer conduit and charged with seeds contained in the main storage bin or hopper. It has been found that the second venturi does not risk causing the entrainment of seeds when the auxiliary storage bin is full, for the residual air stream across the seeds accumulated in the auxiliary storage bin is assured by the second venturi disposed downstream along the conduit. Preferably, the convergent part of the first venturi is oriented downward, to avoid the introduction of seeds therein during the filling of the hopper should this venturi not be supplied with air.

It will be noted that, to obtain the same result, a hermetic main hopper may be used and pressurized by the same air source which supplies the venturi tube.

In certain cases it may be advantageous to modify the particular arrangement of the various parts of the apparatus with respect to one another. In fact, in the course of operation, namely in feeding seeds coated by a treatment powder or seeds of very contorted shapes, the seeds may accumulate by gravity in the connecting section between the hopper and the transfer conduit, and in certain cases, clog the venturi which the air flow is then unable to traverse, the seeds being trapped at the bottom of the hopper.

On the other hand, if the venturis disposed at two different locations along the conduit one to each side of the hopper, they require two separate sources of air which increases the pressure drop and makes the construction of the apparatus bulkier.

So as to reduce or eliminate the clogging of seeds such a double venturi arrangement is provided which simplifies as much as possible the construction of such apparatus. According to a further aspect of the invention there is provided apparatus for supplying air to at least one storage and dispensing unit from a main hopper containing a particulate substance, said apparatus comprising a source of compressed air, a conduit connecting the bottom of the hopper to a transfer conduit communicating with the storage and dispensing unit, a first venturi for drawing off the particulate substance, the constriction of the first venturi opening near the hopper outlet, a second venturi for conveying the particulate substance, the constriction of the second venturi opening near the entrance to the transfer conduit, the conduit connecting the bottom of the hopper to the transfer conduit being a rising conduit and connected laterally to the bottom of the hopper and the constriction of the first venturi opening at the upper part of the connecting section between the conduit and the bottom of the hopper.

Preferably, in such an apparatus, the venturis are disposed along side each other on the same wall of the hopper and both are supplied through a single passage connected to a source of compressed gas.

It is realized that the present pneumatic controlled supply apparatus from a main hopper is of very economical construction, entirely avoiding the aforesaid drawbacks of prior art devices and offering numerous practical advantages.

Various embodiments illustrating the method and apparatus according to the invention are described hereinafter with reference to the accompanying drawings in which:

FIGS. 1–4 show diagrammatically in cross section four different arrangements for mounting venturis.

FIG. 5 shows a diagrammatic view in cross section of an arrangement used with a hermetic hopper.

FIG. 6 shows seeding apparatus, in side view equipped according to the invention; and FIG. 7 illustrated a diagrammatic sectional view of an improved apparatus according to the invention.

In FIGS. 1–4 there are shown a main hopper or storage unit 1, a rising seed outlet 2 located at the bottom of the hopper, an air chamber (or wind chest) 3 supplied by a compressor or blower (not shown) through a conduit 4. Referring now to FIG. 1 alone, the inclined bottom of the hopper includes a grating 5 perforated with holes of dimensions less than those of the particulate material (e.g. seeds) to be conveyed. The seed outlet 2 comprises a chute $2_1$ rising from the hopper bottom and running into the divergent outlet portion 6 of venturi 7 having a waist or constriction $7_1$ through which air leaves the air chamber 3. The venturi 7 is continued by a transfer conduit 8 in which the seeds from the chute 21 are entrained by an air stream emerging from the air chamber 3, through the venturi 7, towards the auxiliary storage bins or units (not shown). In this embodiment, a partial vacuum created at the venturi constriction $7_1$, outside the central hopper draws the seeds from the hopper and a so-called main stream carries them from the venturi 7 to the auxiliary storage bin. The grating 5 tends to minimize the layer of seeds the auxiliary air stream passing through the chute $2_1$ must traverse.

The embodiment of FIG. 2 is the same as that of the preceding embodiment except in the following respects:

The rising chute $2_1$ has an intermediate high point 9 before descending to the divergent portion 6 of the venturi 7 beyond the air chamber; the seeds are conveyed to the auxiliary storage bins over transfer conduit 8.

In the embodiment of FIG. 3, the venturi 7 and the air chamber 3 are accomodated inside the nonhermetic main hopper 1 whose flat bottom has the grating 5. The chute $2_1$ runs into underside of the divergent portion of the venturi 7 so that the seeds are sucked upwardly into the venturi where they are carried by the air stream on through the conduit 8 to the auxiliary storage bins.

Figure 4:
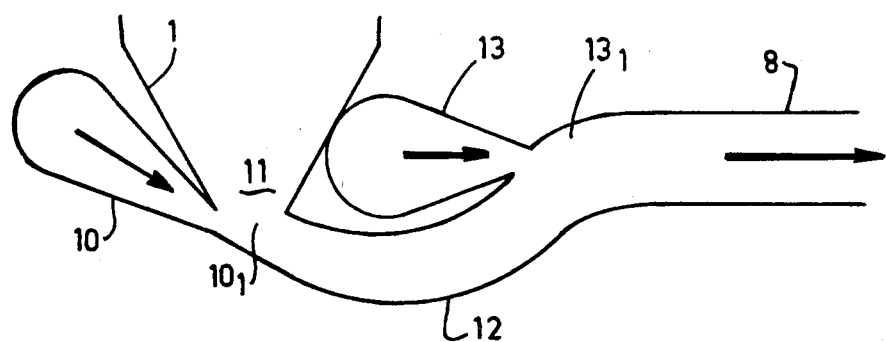

The FIG. 4 embodiment concerns the case in which a nonhermetic hopper 1 open at its bottom is provided. The venturi 10 in this embodiment replaces the air chamber, the air entrains seeds 11 which fall by gravity into the divergent portion $10_1$ of the venturi 10 through a conduit 12 which turns upwardly and then along the conduit 8 to the auxiliary storage bins. A second venturi 13 runs into the rising portion of the conduit 12 which effectively forms the divergent portion $13_1$ thereof, the venturi 13 being supplied by air from a blower or other suitable source (not shown), which air entrains the seeds.

Figure 5:
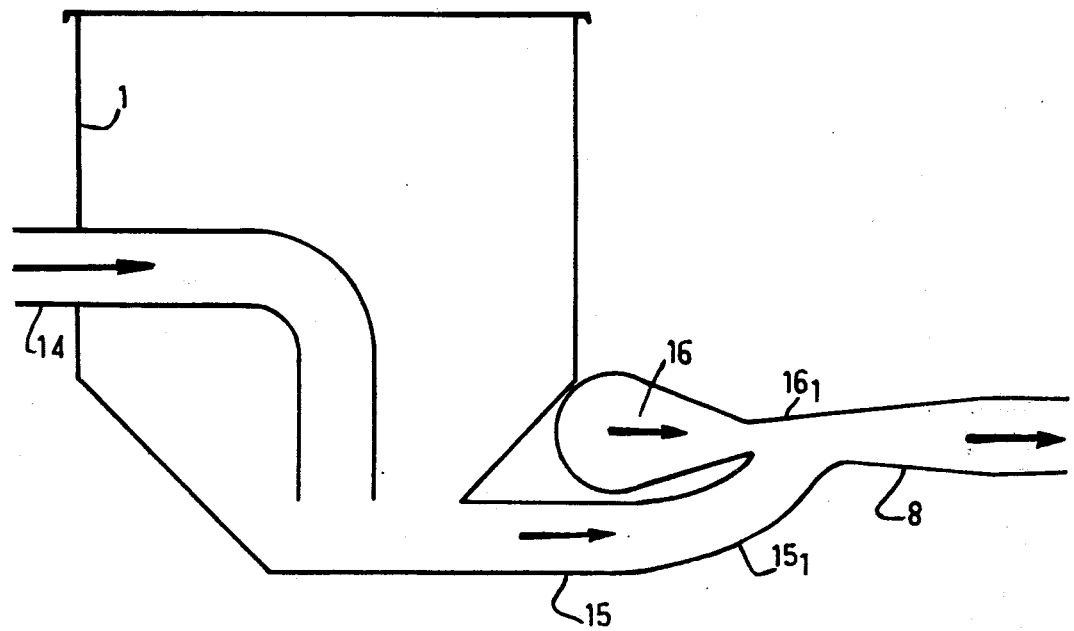

In the embodiment of FIG. 5, there is shown, a main hopper 1 which may or not be hermetic and into which a conduit 14 carrying air from a blower penetrates, the outlet end of the air intake conduit 14 being disposed proximate to the bottom of the hopper which is horizontal in this embodiment.

The outlet chute 15 of the hopper is formed by the continuation of bottom of the hopper and then turns upwards into a rising portion $15_1$ which curves into the transfer conduit 8 running towards the auxiliary storage bins. An air chamber 16 communicates with a venturi constriction followed by a divergent portion $16_1$ at the end of the rising portion $15_1$, and the air which is discharged thereby assure the conveyance of seeds from the chute 15 over conduit 8.

The various preceding embodiments duly demonstrate that the air stream removing seeds and the air stream conveying the seeds are independent or dissociated; practice also shows that the self-regulation ensured under the present operating conditions is complete and that inadvertent and annoying clogging is avoided, whether the seeds are light or heavy.

Figure 6:
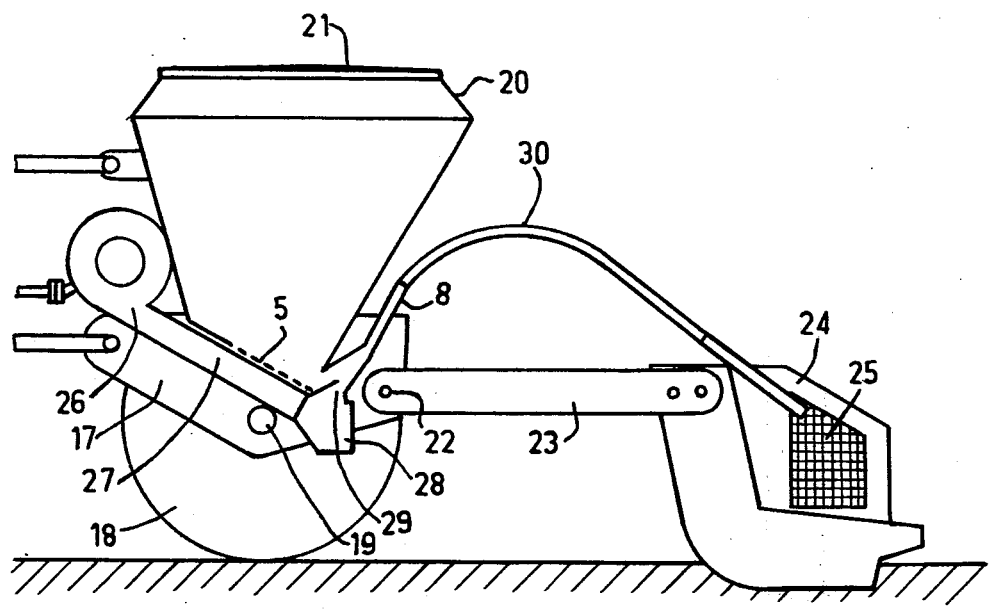

FIG. 6 illustrates in side view a seeding apparatus equipped according to the invention. The seeding apparatus comprises a chassis 17 mounted on two wheels 18 keyed to an axle 19. The chassis 17 supports a main hopper 20 containing seeds for sowing and closed at its top with a cover 21. At the rear of the chassis 17 is provided a common transverse pivot pin 22 rotatably mounted on the chassis. A plurality of arms 23 are pivotally mounted on the pivot pin 22 and are each provided with an auxiliary storage and dispensing unit or sowing unit 24 of any known type having an enclosure including a grate 25. A blower 26 communicates through a conduit 27 with an air chamber 28 which distributes air to venturis 29, one for each sowing unit.

At the bottom of the hopper is shown a grating portion 5 and a rising chute $2_1$ running into the divergent portion of the venturi associated with the air chamber at the entrance to the rising conduit 8, the other end of which is connected to the sowing units 24. It is noted that in the illustrated embodiment, the rising conduit 8 into which the rising seed chute $2_1$ runs has a high point 30 in its path to the sowing units.

Thus, as indicated previously, there may be certain contorted seed shapes which might cause an accumulation in the connecting section between the conduit and the hopper so that the seeds stop up the same preventing the air carried by the venturi from traversing it, whereby a clogging of seeds may occur and the sowing units may stop being supplied.

Figure 7:
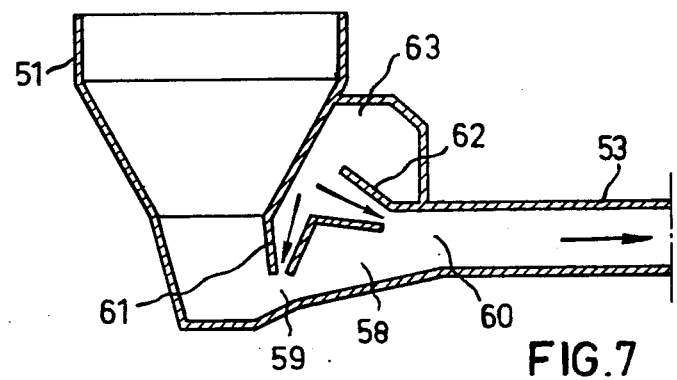
Figure 2:
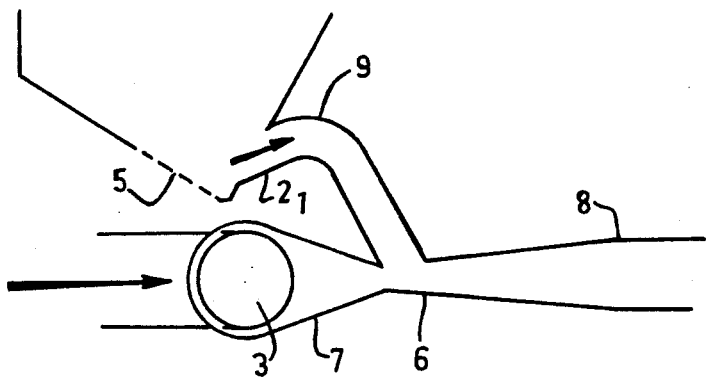
Figure 3:
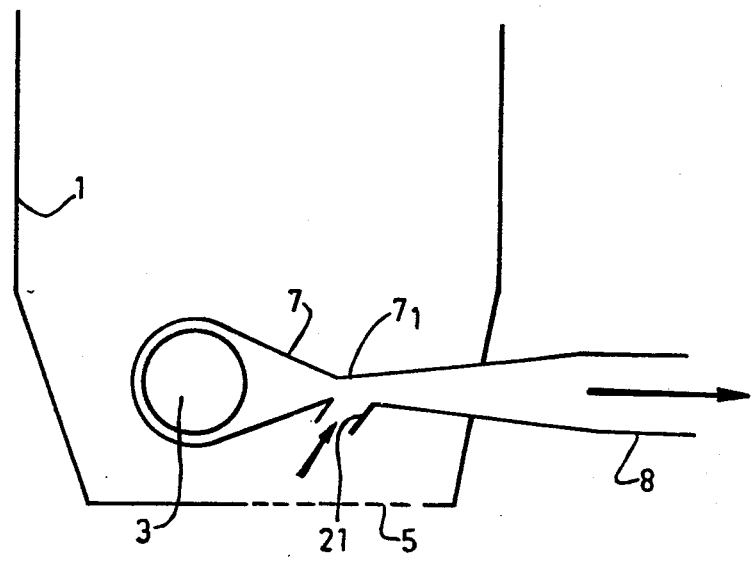

In the seeding apparatus of FIG. 7, the seeds do not leave through an opening in the bottom of the hopper 51 directed downwardly, as in the case of the hopper 1 of the FIG. 1 embodiment, but through a lateral outlet opening at the bottom of the hopper aimed laterally. A rising conduit 58 connects the bottom of the hopper with the raised transfer conduit 53 which in turn communicates with the auxiliary storage and dispensing units.

The convergent portion of the first venturi 61 for drawing off seeds from the hopper runs into the upper part of the connecting section 59 between the intermediate conduit 58 and the bottom of the hopper 51. This venturi 61 is oriented downwardly for carrying an air stream substantially transversely at the lateral outlet of the hopper which coincides with the connecting section 59.

The convergent portion of a second venturi 62 runs into the other end of the intermediate conduit 58 near the connecting zone 60 between the conduits 58 and 53. The second venturi 62 is obliquely oriented relative to the intermediate 58 so as to direct the air stream substantially axially in the transfer conduit 53.

Owing to their location on the same side of the hopper 51 and their substantially right-angled mutual orientation, the convergent portions of venturis 61 and 62 have adjacent entrances or inlets and a common air chamber 63 supplying them both with compressed air through a single passage.

In operation, the pile of seeds heaped in the hopper 51 "collapses" at the outlet or connecting section 59 due to a stream of air created by the first venturi 61 in the connecting section which frees the seeds and carries them toward the conduit 53 via intermediate conduit 58. Once the seeds reach connecting zone 60 they are entrained by the air stream emerging from the second venturi 62 and conveyed to the storage and dispensing units via conduit 53.

By the elimination of the elbow or bend in the intermediate conduit 58 and the provision of the lateral connection of the intermediate conduit 58 to the bottom of the hopper 51, the risk of "clogging" seeds which accumulate by gravity at the bottom of hopper is reduced, and by the arrangement and orientation of the convergent portion of the venturi 61; a high turbulence zone is created in the outlet or connecting section 59 which brings about the continuous "collapse" of the seeds into the section as well as their separation and conveyance through the intermediate conduit 58. Likewise, during periods when the auxiliary storage and dispensing units are not supplied, that is when they are full, the air stream emerging from the first venturi 61 is diverted toward the main hopper by overpressure then present in the conduits 53 and 58, thereby creating a high turbulence zone in the bottom of the hopper 51, preventing the clogging of seeds during such periods.

Finally, the proximity of the venturi to each other makes their supply by a single source of compressed air possible thereby simplifying the construction of the apparatus, the difference of the air flow rates blown through the venturis being determined by differences in their constrictions, so that the air stream passing through the second venturi 62 is larger.

The scope of the invention is obviously not limited to the particular embodiments described hereinbefore, by way of exemple, but also covers all modifications, equivalents and variations within the scope of the appended claims.

Thus, for example, in the apparatus depicted in FIG. 7 the convergent portions of venturis 61 and 62 may have other different angles of inclination relative to the conduit 58, the essence being the forming of a high turbulence at the outlet of the hopper. With this is mind the convergent portion of the first venturi 61 may run tangentially into the wall of the conduit 58 so as to effect in the outlet connecting section 59 a swirl whose kinetic energy will improve the unsticking and ejection of seeds towards the transfer conduit 53.

What is claimed is:

1. A method for controlling the transfer of particulate material from a main hopper to at least one auxiliary storage unit through a hermetic conduit having a rising portion, in which method the particulate substance is entrained in a gas stream whose flow rate varies with the filling of the auxiliary storage unit from the main hopper, wherein the improvement comprises the steps of: forming said auxiliary storage unit to have an increasing resistance to gaseous flow thereinto as the level of particulate material rises therein, creating a partial vacuum at a location in the conduit with the pressure at said location rising as the auxiliary storage units fills with the pressure reaching at least zero when the auxiliary storage unit is full; and introducing the particulate material into the gas stream substantially at said location.

2. A method for controlling the transfer of particulate material from a main hopper charged with the particulate substance to an auxiliary storage unit through a hermetic conduit having a rising portion, said method comprising the steps of: forming said auxiliary storage unit to have an increasing resistance to gaseous flow thereinto as the level of particulate material rises therein, providing a gas stream in the conduit flowing towards the auxiliary storage unit; introducing the particulate material into the gas stream in the conduit at a predetermined location; entraining the particulate material in the gas stream along the conduit towards the auxiliary storage unit; and creating a partial vacuum at said predetermined location in the conduit with the partial vacuum diminishing as the auxiliary storage unit fills with the pressure rising at least to zero when the auxiliary storage unit is full.

3. A method according to claim 1 wherein the gas stream is an air stream which emerges through a venturi which carries air into the rising portion of the conduit, and further comprising exhausting air from the auxiliary storage unit.

4. A method according to claim 1, further comprising admitting air which is the gas into the main hopper proximate to the outlet for particulate material.

5. A method according to claim 1, a high point being provided in the conduit between said main buffer and said auxiliary storage unit, further comprising admitting upstream of the high point relative to the flow of the gas stream an additional gas stream for assisting the entrainment of particulate material.

6. Apparatus for controlling the transfer of particulate material comprising a main hopper, at least one auxiliary storage unit, hermetic conduit means having a rising portion and carrying the particulate material from said main hopper to said auxiliary storage unit, a source of gas under pressure providing a gas stream in said conduit means which entrains the particulate material to said auxiliary storage unit, means for introducing the particulate material into the gas stream at a predetermined location in said conduit means, means for providing a partial vacuum at said predetermined location in said conduit means, and said auxiliary storage storage unit having vent means for said gas of the type gradually blocked by particulate material rising therein for effecting an increasing back pressure in said conduit means varying the partial vacuum as a function of the filling of auxiliary storage unit so that the pressure at said predetermined location rises at least to zero when said auxiliary storage unit is full.

7. Apparatus according to claim 6, further comprising means provided at the bottom of said main hopper for bringing the interior of said main hopper into communication with the surroundings, outlet chute means also provided at the bottom of said main hopper and connected proximate to the constriction of venturi means, said venturi means being connected between said source of pressurized gas and said conduit means, said auxiliary storage unit having lateral venting means of dimensions smaller than the particulate material for bringing the interior of said auxiliary storage unit into communication with the surroundings.

8. Apparatus according to claim 7, wherein said outlet chute means of said main hopper rises and runs into the divergent portion of said venturi means.

9. Apparatus according to claim 7, wherein said venturi means is accomodated inside said main hopper.

10. Apparatus according to claim 7, wherein said venturi means is disposed outside said main hopper.

11. Apparatus according to claim 6, wherein at least one said source of gas under pressure is associated with first and second venturi means, said first venturi means connected proximate to the outlet of said main hopper and drawing off particulate material therefrom, and conveying it to the rising portion of said conduit means, said second venturi opening into said rising portion of said conduit means upstream of the upper end of said rising portion relative to the flow of the gas stream therethrough, said second venturi conveying the particulate material downstream to said auxiliary storage unit.

12. Apparatus according to claim 11, wherein the main hopper outlet is disposed laterally and wherein said rising portion of said conduit means connects said main hopper outlet with the rest of said conduit means, the convergent portion of said first venturi means opening into the upper side of said rising portion.

13. Apparatus according to claim 12, wherein the convergent portion of said first venturi means is oriented downwards and generally transversely at said main hopper lateral outlet.

14. Apparatus according to claim 12, wherein the convergent portion of said first venturi means is connected to the rising portion of said conduit means generally tangentially of the wall thereof.

15. Apparatus according to claim 11, wherein the convergent portion of said first and second venturi means are disposed on the same side of said main hopper adjacent to each other, a single said source of gas under pressure being connected to said first and second venturi means through a single passage.

* * * * *